(12) United States Patent  
Kumar et al.

(10) Patent No.: US 8,795,581 B2  
(45) Date of Patent: Aug. 5, 2014

(54) PROCESS FOR MANUFACTURING HIGH DENSITY SLIP-CAST FUSED SILICA BODIES

(75) Inventors: Andi U. Kumar, Karnataka (IN); Selvaraj S. Kumar, Karnataka (IN)

(73) Assignee: Council of Scientific & Industrial Research, New Delhi (IN)

( * ) Notice: Subject to any disclaimer, the term of this patent is extended or adjusted under 35 U.S.C. 154(b) by 333 days.

(21) Appl. No.: 13/116,643

(22) Filed: May 26, 2011

(65) Prior Publication Data

US 2012/0098169 A1    Apr. 26, 2012

(30) Foreign Application Priority Data

May 31, 2010   (IN) ............................ 1243/DEL/2010

(51) Int. Cl.
*C04B 33/28* (2006.01)
(52) U.S. Cl.
USPC ..................................................... 264/651
(58) Field of Classification Search
USPC ................................................... 264/651
See application file for complete search history.

(56) References Cited

U.S. PATENT DOCUMENTS

| | | | | |
|---|---|---|---|---|
| 5,213,729 | A * | 5/1993 | Edler et al. | 264/639 |
| 5,714,112 | A * | 2/1998 | Hazeyama et al. | 264/675 |
| 5,728,470 | A * | 3/1998 | Hazeyama et al. | 428/426 |
| 5,914,086 | A * | 6/1999 | Hermann et al. | 264/430 |
| 6,387,318 | B1 * | 5/2002 | Xue et al. | 264/642 |
| 2011/0129784 | A1 * | 6/2011 | Bange et al. | 432/265 |

OTHER PUBLICATIONS

Reed, James S. Principles of Ceramics Processing, Second Edition. New York: John Wiley & Sons, 1995. pp. 318-324, 493-524, 545-561.*

* cited by examiner

*Primary Examiner* — Joseph S Del Sole
*Assistant Examiner* — Russell Kemmerle, III
(74) *Attorney, Agent, or Firm* — Edwards Wildman Palmer LLP; Barry Kramer; Nicholas J. DiCeglie, Jr.

(57) ABSTRACT

Fused silica ceramics plays demanding role in high velocity missile/aircraft' radome development. Slip casting is the most common and commercially viable process utilized for radome production. Unfortunately slip casting cannot afford high density due to its poor green packing density which in turn results in poor rain erosion resistance. Present invention discloses process for preparing high density fused silica bodies by adding boron oxide ($B_2O_3$) with the commercially available high purity fused silica as sintering aid cum de-vitrification inhibitor. Various concentrations of $B_2O_3$ were added to high purity fused silica. Thus formed compositions were made into slip-castable slurries in aqueous medium without any addition of dispersing agents. The reheological properties like mild shear thinning and low thixotropic behaviour of the slurries were established. These slurries were then slip-casted in plaster of parries mold. The green and sintered properties of the casted samples were studied. The sintered sample with density higher than 2 g/cc (90-95% of the theoretical density) was achieved without de-vitrification. XRD studies on sintered samples showed the amorphous nature of the sample. The improved properties of fused silica system can favor its utilization in radome applications.

4 Claims, 2 Drawing Sheets

PROCESS FOR MANUFACTURING HIGH DENSITY SLIP-CAST FUSED SILICA BODIES

FIELD OF INVENTION

Figure 1:
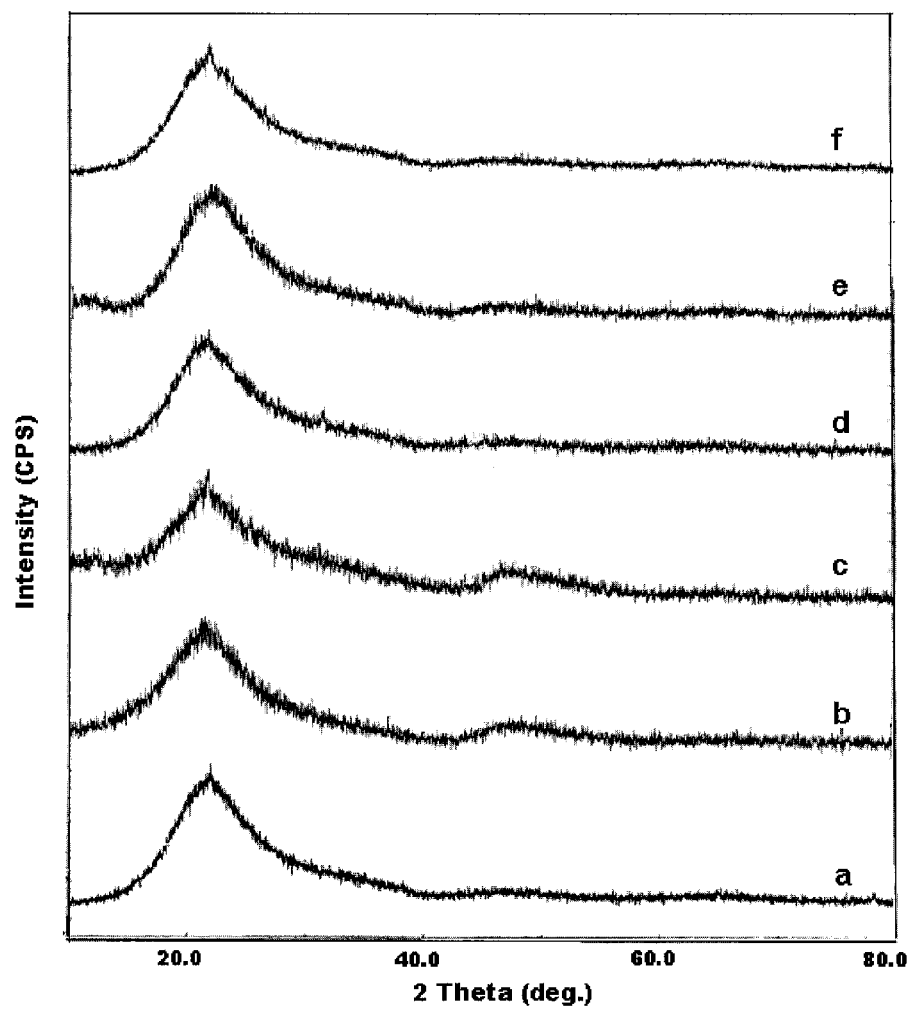

The present invention relates to a process for manufacturing High Density Slip-cast Fused Silica Bodies. More particularly, the present invention relates to a process for manufacturing High Density Slip-cast Fused Silica Bodies useful for radome fabrication.

BACKGROUND OF INVENTION AND DESCRIPTION OF PRIOR ART

The vitreous fused silica ceramics plays a major role in aerospace applications. Amorphous form of fused silica is well known for interesting properties such as its very good thermal shock resistance, low and stable dielectric properties (dielectric constant and loss tangent) in the wide range of temperature, most abundant in nature, ease of fabrication, relatively cheap of all other ceramics suitable for radomes (e.g. alumina, boron nitride, mullite, silicon nitride etc). Because of these qualities, it is found suitable for radome applications over other ceramic materials to maintain mechanical strength at high temperature and low losses. Radome is a structural enclosure for radar antenna of ship, aircrafts or missiles providing good protection from hostile environments (e.g. aerodynamic heating, bird hits, rain erosion etc) without interference to the operation of the antenna. Modern high velocity aircrafts, missiles demands materials which can with stand high thermal shock, greater surface temperature, larger loading force and heavy rain erosion. These requirements can be met only by ceramic radomes.

It is noteworthy to mention here that fused silica has a tendency to de-vitrify and turns to crystalline phase (e.g. α-cristobalite) during sintering when excessive temperature and prolonged sintering is selected. This in turn transform into β-cristobalite structure while cooling to 180° C.-270° C. due to displacive transformation, which is common in silica ceramics. The volume change involved in this phase transformation leads to loss of strength and thermal shock resistance of the material. So it becomes necessary to incorporate crystallization control measures while sintering.

Slip casting of fused silica is a most viable process for radome production. Slip casting has its own advantages like cost effectiveness, simplicity, scalability and ease in handling of complex designs. In addition, slip cast fused silica displays relatively very less shrinkage in comparison to alumina or pyroceram which in turn favors thickness control measures. Accordingly, slip casting of fused silica is considered as a most prudent way for radome production and thus it has been most widely practiced till now. But due to moderate green packing density (around 75-80% of theoretical density) of slip-cast radomes, the sintered density will be mostly around 85-90% of theoretical density. Consequently, this porous nature of radome leads to water absorption problem which in turn deteriorates its property at operating conditions.

Various attempts have been made to overcome this problem. But, most of them lead to complex and costly processes which were not as fruitful as slip casting. Hence, it is essential to improve density and to retard devitrification for realizing high density slip cast fused silica bodies.

Prior art search was made in the patent and non-patent public literature to find out the works related to present invention. None of the prior-art literature discloses the method for developing high density slip-cast fused silica structures for radome application by adding Boron Oxide ($B_2O_3$) with the fused silica and using slip casting method for manufacturing fused silica bodies. However, the following literatures are referred due to their relevance to the field of present invention.

Reference may be made to Korean patent application number KR2007066729-A, wherein a fabrication process is disclosed for manufacturing high density and high fracture toughness radome using slip casting technique by addition of silica staple fiber to silica slurry. But maintaining uniform suspension of slip cast slurry during casting remains challenging which in turn complicates the process. Further it is difficult to maintain uniform dielectric loss in all direction and subsequently degrades the electromagnetic performance.

Reference may also be made to U.S. Pat. No. 6,091,375, which discloses radome with porous structure impregnated with glass, ceramics etc. It involves additional impregnating steps. However, it is difficult to ensure uniform impregnation. Further, thermal mismatch between matrix and impregnate at high temperature is not addressed properly.

Reference may be made to U.S. Pat. No. 4,949,095, wherein a new and improved high density fused silica radome is discussed. It describes that the radome is made by an arc fusion process, in which a quartz powder is placed within a graphite mold, and then shaped by centrifugal force as the mold is rotated. An arc is then struck between electrodes within the mold cavity. The quartz powder fuses to form a dense silica radome which is removed from the mold after the fusion occurs. Nonetheless, the said process of this is complex, expensive and is not suitable for large scale production.

U.S. Pat. Nos. 4,504,114 and 6,669,536 discuss about Boron doped fused silica for optical fiber applications. However, it mostly involves expensive vapor phase synthesis route which can only suit to perform preparation for optical fibers production.

From the above mentioned prior-art, it is understood that there is need for preparing high density fused silica bodies by simple, inexpensive route suitable for large scale production more particularly for radome fabrication. Density by slip casting as reported in prior-art is around 85% of theoretical density. This needs to be further improved in order to enhance the rain erosion resistance. Hence, there is a need to evolve a process for manufacturing the high density fused silica bodies by using slip-casting method.

OBJECTS OF THE INVENTION

The main object of the present invention is to provide a simple and cost-effective method for developing high density fused silica bodies, which obviates the drawbacks as detailed above.

Another object of the present invention is to provide high density fused silica bodies by doping the fused silica with boron oxide ($B_2O_3$). Yet another object of the present invention is to use slip-cast method for manufacturing the high density fused silica bodies.

SUMMARY OF THE INVENTION

The present invention provides high density slip-cast fused silica bodies for radome application by preparing fused silica slurry by milling commercially available fused silica powder with Boron Oxide ($B_2O_3$) up to 3 wt % as a sintering aid cum de-vitrifying inhibitor in aqueous medium and slip casting the slurry for manufacturing fused silica bodies. The present invention aims at providing high density fused silica structures in the order of 90 to 95% of theoretical density. It also provides erosion resistant fused silica structures suitable for radome applications.

Above said objectives of the present invention are achieved by incorporating following inventive steps while performing the invention:

Addition of 0.1 to 3 wt % Boron Oxide with high purity fused silica.

Maintaining the consistency of slurry with suitable rheological behaviour.

Using slip cast process for manufacturing fused silica structures.

Establishing the controlled sintering schedule.

Accordingly, the present invention provides a process for the preparation of high density Slip-cast Fused Silica bodies comprising the steps of:

a) preparing the slip cast slurry by ball milling the commercially available fused silica powder with $B_2O_3$ as sintering aid cum de-vitrification inhibitor with solid loading in the range of 75 to 81 wt % in the aqueous medium;

b) milling the slurry as obtained in step [a] for 24 to 48 hours;

c) slip casting of milled slurry as obtained in step [b] in the plaster of paris molds followed by air drying to obtain slip casted fused silica green bodies;

d) separating the dried silica green bodies as obtained in step [c] from mold and drying in hot oven at 180° C. for 4 hrs;

e) sintering the oven dried green bodies as obtained in step [d] at a temperature of 1200-1300° C. for 2-4 hrs to obtain the desired high density Slip-cast Fused Silica bodies.

In an embodiment of the present invention, $B_2O_3$ content in the slurry ranges from 0.1 to 3 wt % of total solid contents.

In another embodiment of the present invention, the fused silica powder content in the slurry ranges from 97 to 99.9 wt % of total solid contents.

In yet another embodiment of the present invention, the particle size of fused silica in slurry ranges between 3.5 microns to 5 microns.

In still another embodiment of the present invention, the dynamic viscosity of slurry is in the range of 75-95 cp @51 sec$^{-1}$.

BRIEF DESCRIPTION OF THE ACCOMPANYING DRAWINGS

FIG. 1 shows the XRD patterns of sintered fused silica with (a) 0 wt %, (b) 0.1 wt %, (c) 0.5 wt %, (d) 0.9 wt % (e) 1 wt % and (f) 2 wt % B2O3. It compares the XRD pattern of $B_2O_3$ doped and undoped fused silica compositions. During sintering in air atmosphere, the presence of moisture may cause surface devitrification. The XRD patterns highlight that there is no secondary phase visible in any of the compositions. Also the XRD results reveal that the $B_2O_3$ doped compositions are reasonably amorphous in nature.

Figure 2:
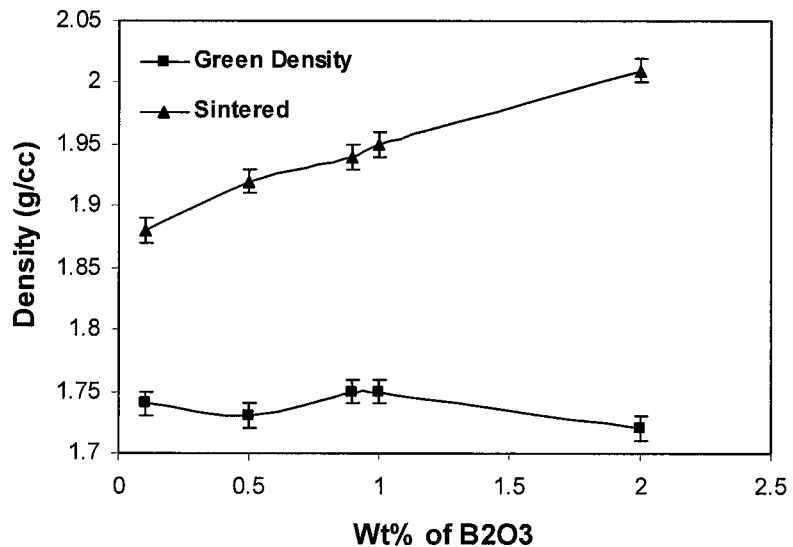
Figure 3:
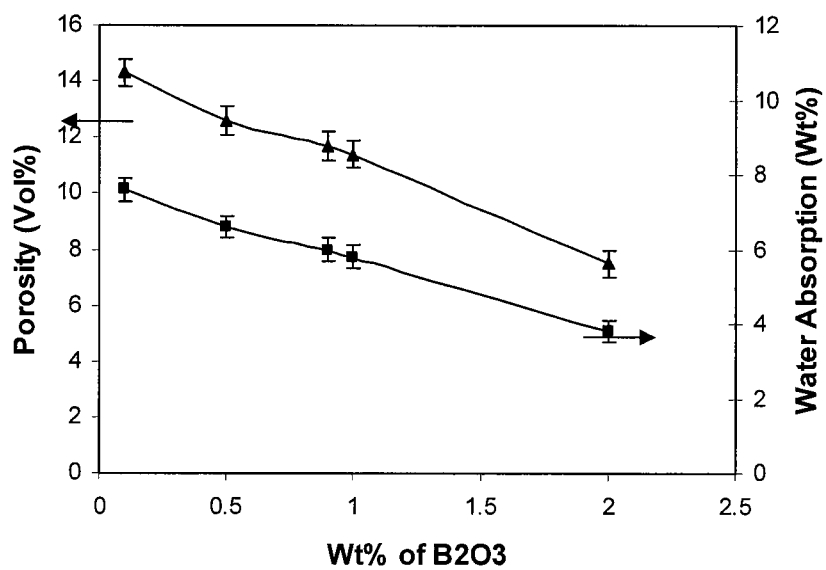

FIGS. 2 & 3 displays the density, porosity and water absorption of fused silica bodies prepared with addition of $B_2O_3$ as sintering aid cum de-vitrification inhibitor which are mentioned in examples 1-5 by the process of present invention. The plot of density vs. concentration of $B_2O_3$ clearly proves that the sintered density increases with the addition of $B_2O_3$ whereas the green density remains around 1.74 g/cc. The immersion based porosity results emphasized that the porosity decreases with $B_2O_3$ content from 14.3 to 7.5 vol %. As a consequent of this, water absorption of the material got decreased to 50% of the initial value. This may contribute to the improved rain erosion resistance of radome at the operating conditions.

DETAILED DESCRIPTION OF THE INVENTION

Slip-casting technique is commonly considered for radome fabrication due to its simplicity and cost effectiveness. Success of this technique mainly depends on slurry preparation. In the present invention, slurry compositions were prepared with commercially available high purity fused silica (>99 wt % $SiO_2$ with 611 ppm $Al_2O_3$, 17 ppm $Fe_2O_3$, 17 ppm CaO, 12 ppm MgO, 27 ppm $Na_2O$ and 21 ppm $K_2O$) and anhydrous boric oxide (99 wt % $B_2O_3$) in aqueous medium. As the initial particle size has to play a major role in green packing density, the particle size ($d_{50}$) of fused silica was kept around 3.5-5 microns.

Different slurry compositions with $B_2O_3$ in the range of 0.1-3 wt % were prepared in aqueous medium. The solid loading of slurry was maintained at 75-81 wt % for all the compositions. Slurries thus formed were ball milled. Milling also plays important role in the preparation of slurry for slip casting. Effective milling leads to breaking of agglomerations, complete wetting of particles and surface hydration which are the essential factors for stable and low viscous free flowing suspension. In present case milling was done for about 24-48 hrs.

The rheological studies gave the detailed insight about the quality of the slurry. The viscosity of entire compositions was in the range of 75-95 cp @51 sec$^{-1}$. The lower magnitude thixotropy of slurry emphasized the presence of greater inter-particle network in the slurry. Similarly from the mild shear thinning behavior, it was confirmed that the slurry was free of agglomerates and the wetting of each particle surface was completed.

Further the slurry was casted in plaster of paris mold into discs (39 mm dia & 10 mm thick) and cylinders (10 mm diameter & 100 mm height). Casted samples were dried at 180° C. for 4 hrs and further they were sintered at 1200-1400° C. for 2-4 hrs.

EXAMPLES

The following examples are given by the way of illustration and therefore should not be construed to limit the scope of the present invention.

Example 1

Slip cast slurry was prepared by mixing 78 wt % solid content in 22 wt % water without any addition of dispersing agent. The solid content composed of 99.9 wt % high purity fused silica and 0.1 wt % $B_2O_3$. Thus formed composition is milled in a ball mill for about 24 hrs so as to obtain slurry with low thixotropy and mild shear thing behaviour. Further the slurry was slip-casted in plaster of paris mold into desirable shape. The slip-casted green bodies were dried at room temperature and 180° C. for about 24 hrs and 4 hrs respectively. Subsequently the green bodies were sintered at 1250° C. for 2 hrs. Density, porosity and water absorption of fused silica structures were found to be 1.88±0.01 g/cc, 14.3±0.5 vol % and 7.6±0.3 wt % respectively. The amorphous nature of the sample was confirmed by XRD analysis.

Example 2

The process as said in example-1 was repeated except that amount of $B_2O_3$ in solid content was kept at 0.5 wt %. Density, porosity and water absorption of thus obtained structures were 1.92±0.01 g/cc, 12.6±0.5 vol % and 6.6±0.3 wt % respectively.

Example 3

The process as said in example-1 was repeated except that amount of $B_2O_3$ in solid content was kept at 0.9 wt %. Density, porosity and water absorption of thus obtained structures were 1.94±0.01 g/cc, 11.7±0.5 vol % and 6.0±0.3 wt % respectively.

Example 4

The process as said in example-1 was repeated except that amount of $B_2O_3$ in solid content was kept at 1.0 wt %. Density, porosity and water absorption of thus obtained structures were 1.95±0.01 g/cc, 11.4±0.5 vol % and 5.8±0.3 wt % respectively.

Example 5

The process as said in example-1 was repeated except that amount of $B_2O_3$ in solid content was kept at 2.0 wt %. Density, porosity and water absorption of thus obtained bodies were 2.02±0.01 g/cc, 7.5±0.5 vol % and 3.8±0.3 wt % respectively.

The characteristics of slurries prepared as per examples 1-5 are given in table 1. It shows that the viscosity of the slurries were controlled between 75 to 95 cp @51 $sec^{-1}$.

TABLE 1

| Example | $B_2O_3$ content Wt % | pH | Viscosity @51 $sec^{-1}$ cp |
|---|---|---|---|
| 1 | 0.1 | 4.8 | 92.4 |
| 2 | 0.5 | 4.5 | 89.4 |
| 3 | 0.9 | 3.8 | 89.8 |
| 4 | 1.0 | 3.5 | 78.5 |
| 5 | 2.0 | 3.2 | 91.6 |

Advantages Of The Invention:

The $B_2O_3$ doped fused silica structure prepared by this process has relatively higher density and hence low water absorption which in turn can provide improved rain erosion resistance property.

The disclosed process is simple, cost effective and suitable for large scale production.

We claim:

1. A process for the preparation of Slip-cast Fused Silica bodies comprising the steps of:
   a) preparing a slip cast slurry by ball milling a fused silica powder with $B_2O_3$ as sintering aid cum de-vitrification inhibitor with solid loading in the range of 75 to 81 wt % in the aqueous medium, and wherein the $B_2O_3$ content in the slurry ranges from 0.1 to 0.5 wt % of the total solid contents;
   b) milling the slurry as obtained in step [a] for 24 to 48 hours;
   c) slip casting the milled slurry as obtained in step [b] in a plaster of paris molds followed by air drying to obtain slip casted fused silica green bodies;
   d) separating the dried silica green bodies as obtained in step [c] from mold and drying in hot oven at 180° C. for 4 hrs;
   e) sintering the oven dried green bodies as obtained in step [d] at a temperature of 1200-1300° C. for 2-4 hrs to obtain the desired high density Slip-cast Fused Silica bodies.

2. A process as claimed in claim 1, wherein the fused silica powder content in the slurry ranges from 97 to 99.9 wt % of the total solid contents.

3. A process as claimed in claim 1, wherein the median ($d_{50}$) particle size of the fused silica in the slurry is between 3.5 microns to 5.0 microns.

4. A process as claimed in claim 1, wherein the dynamic viscosity of slurry is in the range of 75-95 cp @51 $sec^{-1}$.

* * * * *